(12) United States Patent
Reid

(10) Patent No.: US 6,581,548 B1
(45) Date of Patent: Jun. 24, 2003

(54) ANIMAL THEFT PREVENTION AND RESTRAINT DEVICE

(76) Inventor: David M. Reid, 23 Waverly Pl. #2 U, New York City, NY (US) 10003

(*) Notice: Subject to any disclaimer, the term of this patent is extended or adjusted under 35 U.S.C. 154(b) by 18 days.

(21) Appl. No.: 09/940,997

(22) Filed: Dec. 12, 2001

(51) Int. Cl.$^7$ ............................................. A01K 27/00
(52) U.S. Cl. ......................................................... 119/795
(58) Field of Search ................................ 119/797, 798, 119/795, 793, 786, 787, 769

(56) References Cited

U.S. PATENT DOCUMENTS

| | | | | |
|---|---|---|---|---|
| 2,561,487 A | * | 7/1951 | Bailhe | 114/230.26 |
| 2,827,017 A | * | 3/1958 | Ryan | 119/793 |
| 3,798,934 A | * | 3/1974 | Wright et al. | 119/795 |
| 3,867,905 A | | 2/1975 | Vail | 119/109 |
| 4,398,500 A | | 8/1983 | Koronkiewiez | 119/109 |
| 5,174,246 A | * | 12/1992 | Driver | 119/792 |
| 5,462,019 A | * | 10/1995 | Hong-Rong et al. | 119/795 |
| 5,483,925 A | * | 1/1996 | Childress | 119/795 |
| 5,485,811 A | | 1/1996 | Jacobsen et al. | 119/798 |
| 5,709,172 A | * | 1/1998 | Maglich | 119/795 |
| 5,722,351 A | * | 3/1998 | Roper | 119/795 |
| 6,095,094 A | | 8/2000 | Phillips | 119/792 |

* cited by examiner

*Primary Examiner*—Thomas Price

(57) ABSTRACT

The present invention is a cable with a lockable clamp on each end able to grip the cable so that loops can be formed of variable size, for the securing of pets or livestock against wandering off and unauthorized removal while maximizing the safety, reliability, and convenience to the user and the animal. Self contained and easy to operate, the cable is run through one of the lockable clamps forming a snug loop around the neck of the animal at one end, and again around an secure object at the other, the lock is then engaged, if so desired, and the animal is secure. When the proper code is put into one of the lockable clamps, the same for both lockable clamps, the release is able to be moved and the cable freed from the lockable clamps. The cable is cut resistant, and coated in semi-soft non-conducting material. The lockable clamps are hard frames, whose exterior facing surfaces are covered by semi-soft non-conducting material, and has the mechanism for clamping, locking, unlocking, and releasing contained securely within.

11 Claims, 15 Drawing Sheets

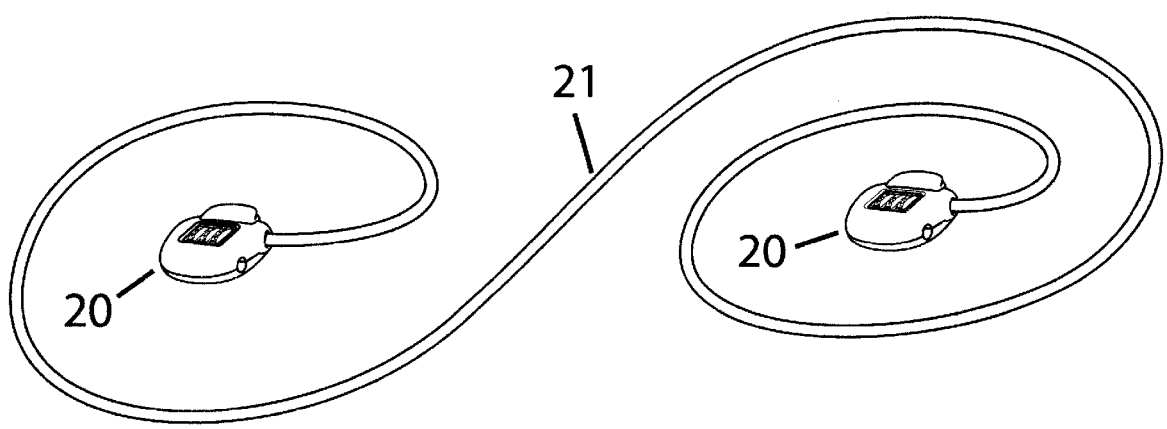
Fig.1-A

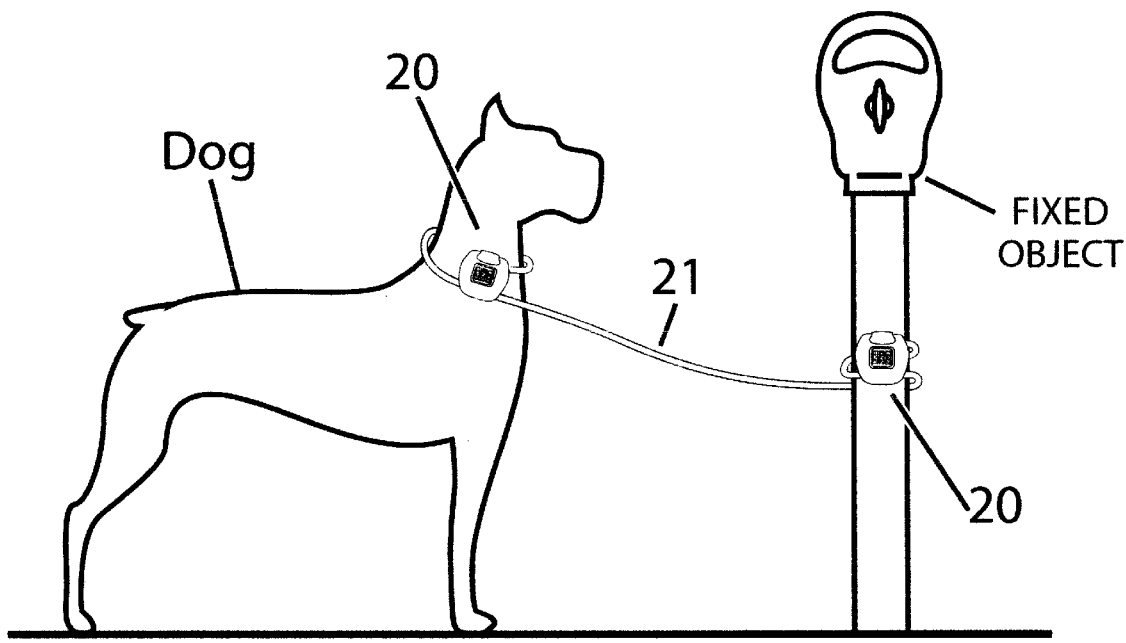
Fig.1-B
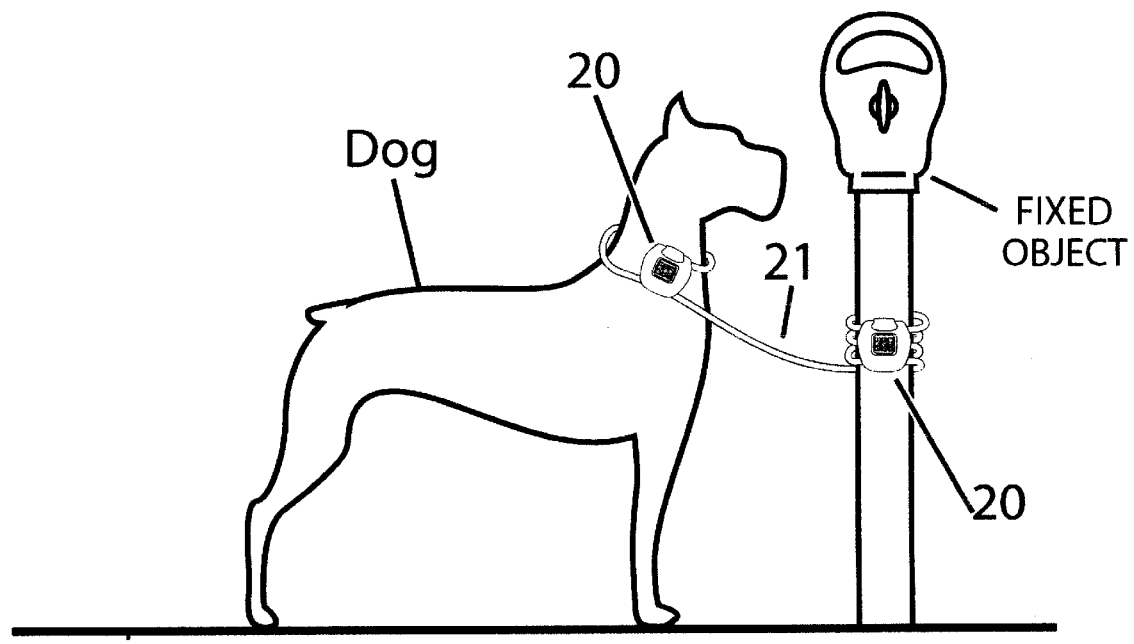
Fig.1-C

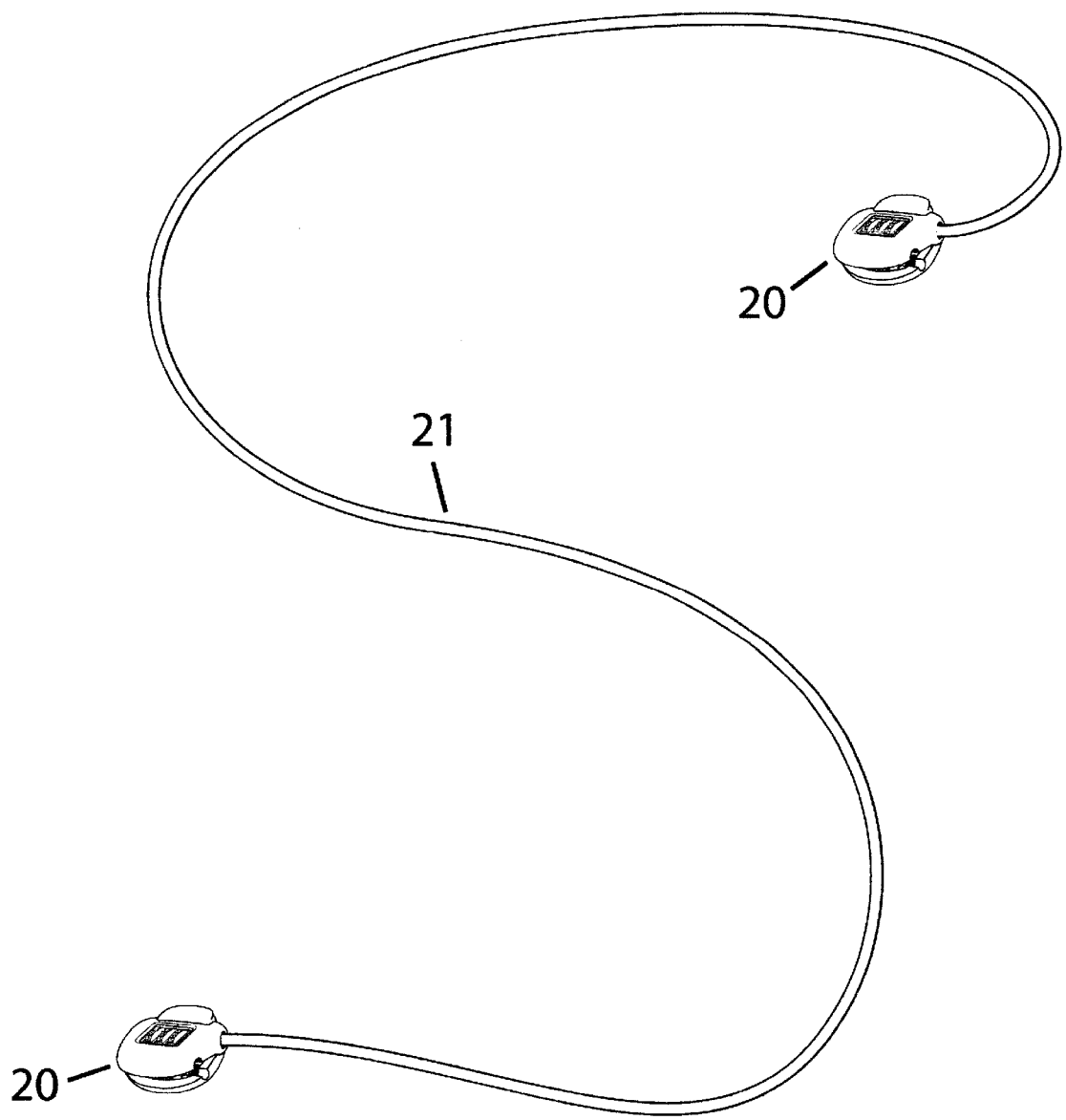
Fig.1-D

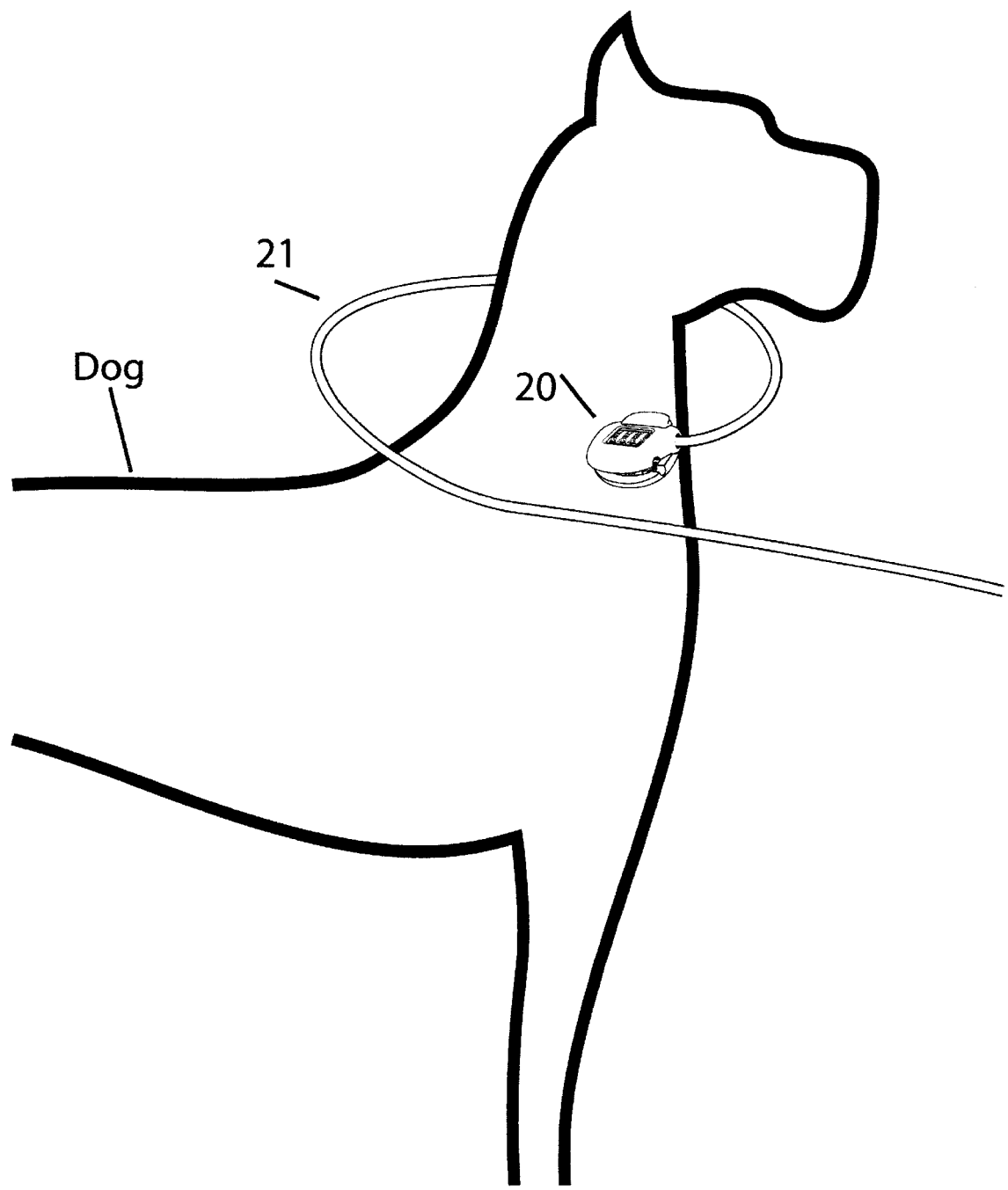
Fig.1-E

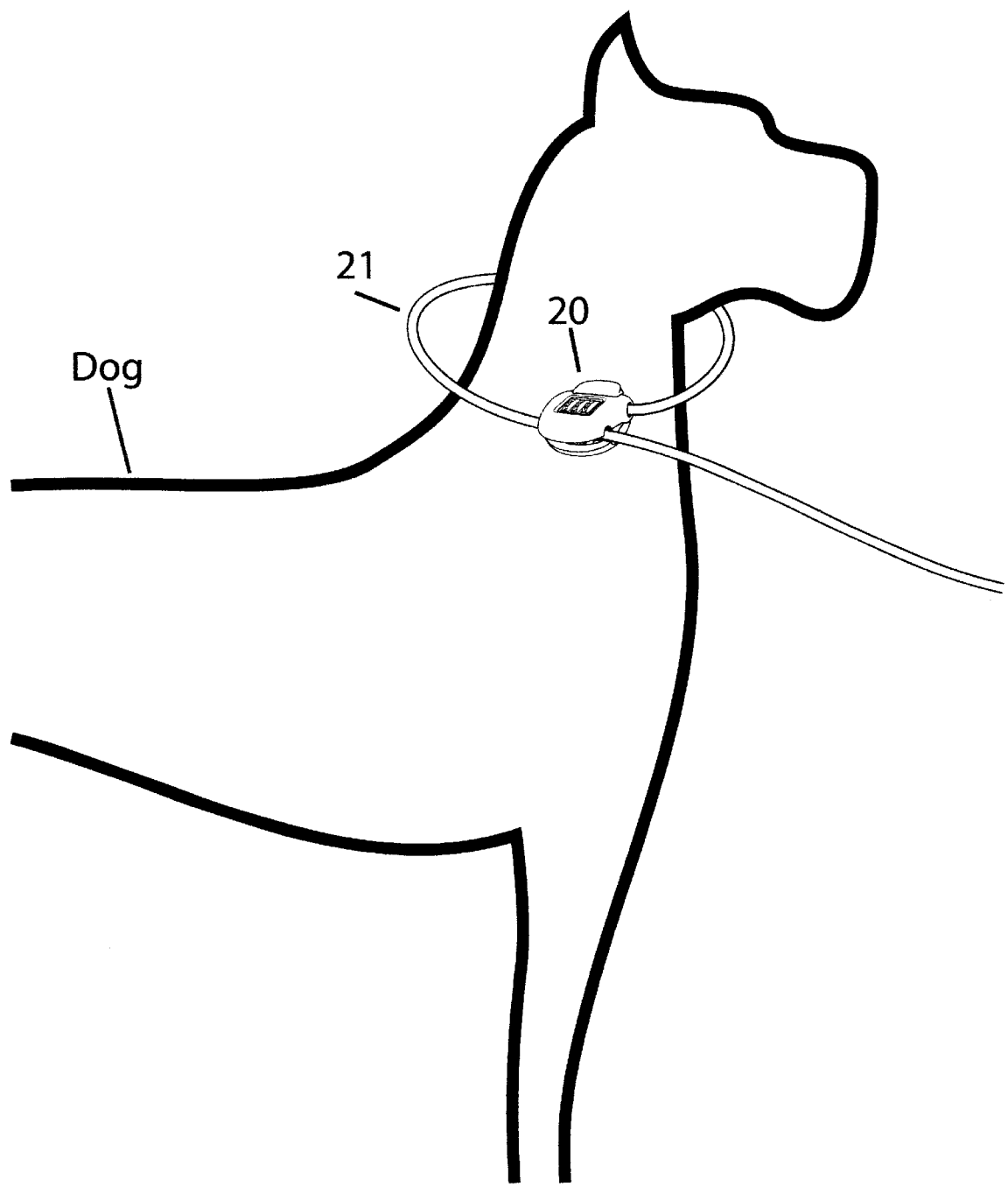
Fig.1-F

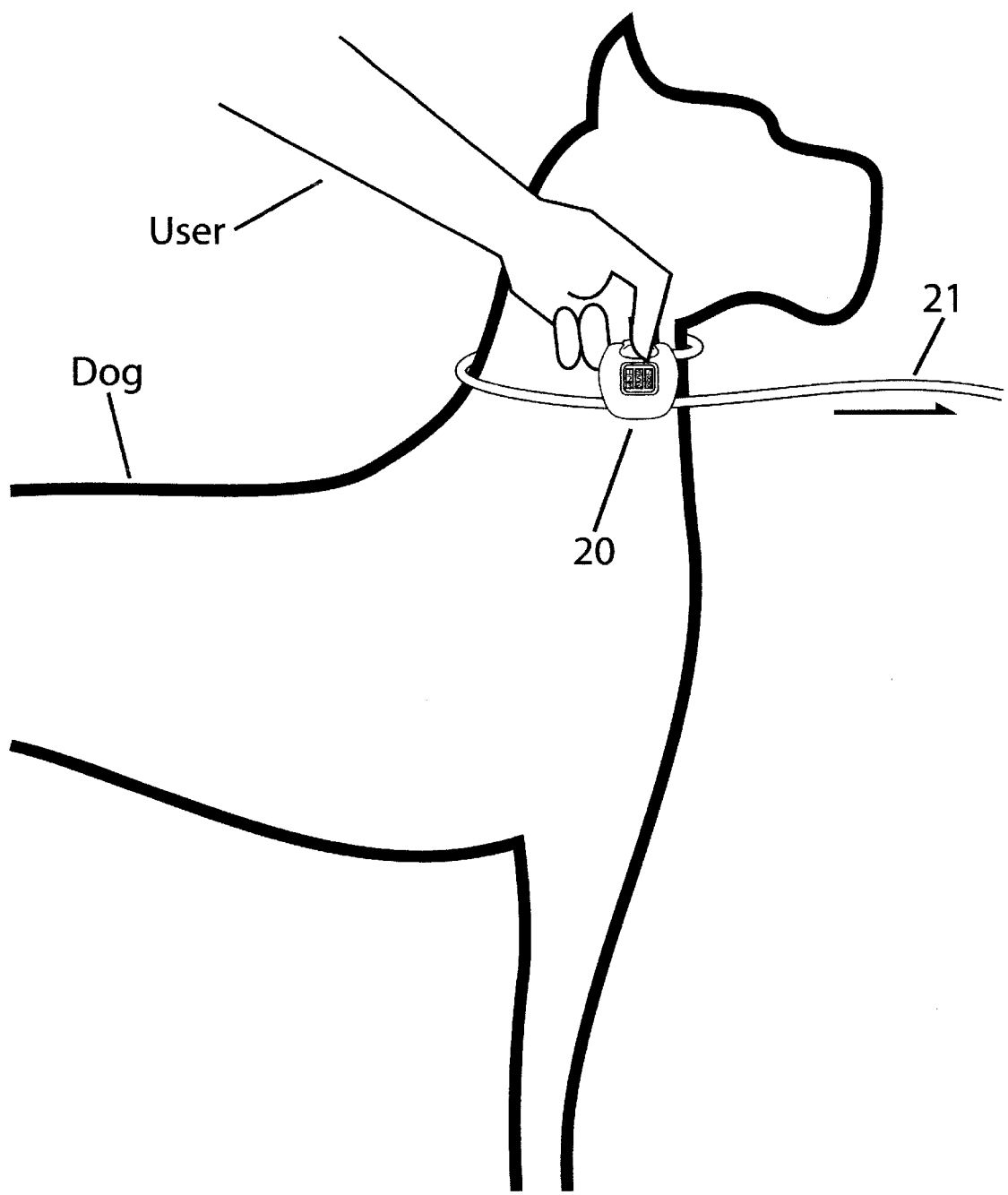
Fig.1-G

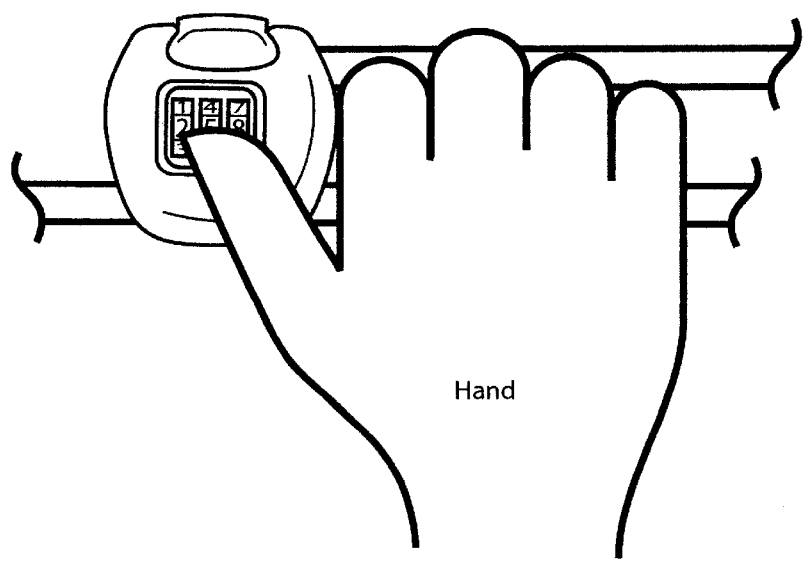
Fig.1-H
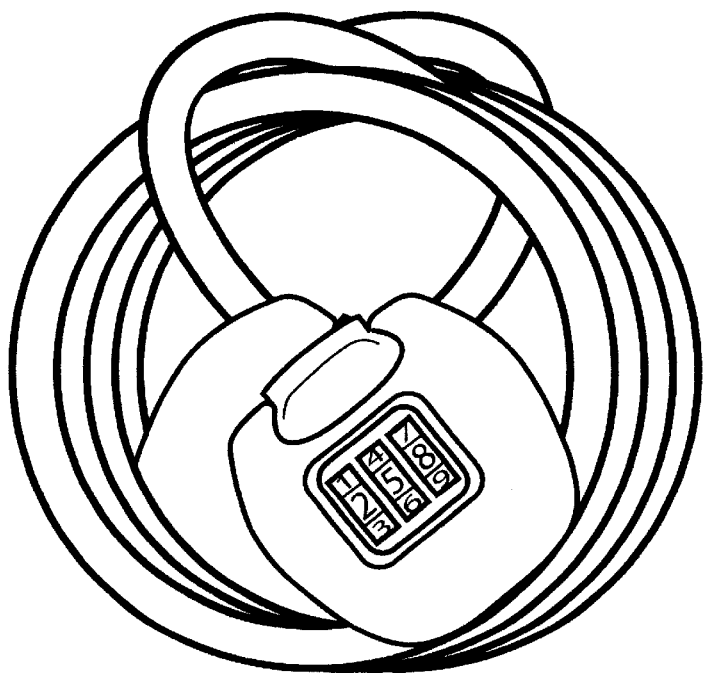
Fig.1-I

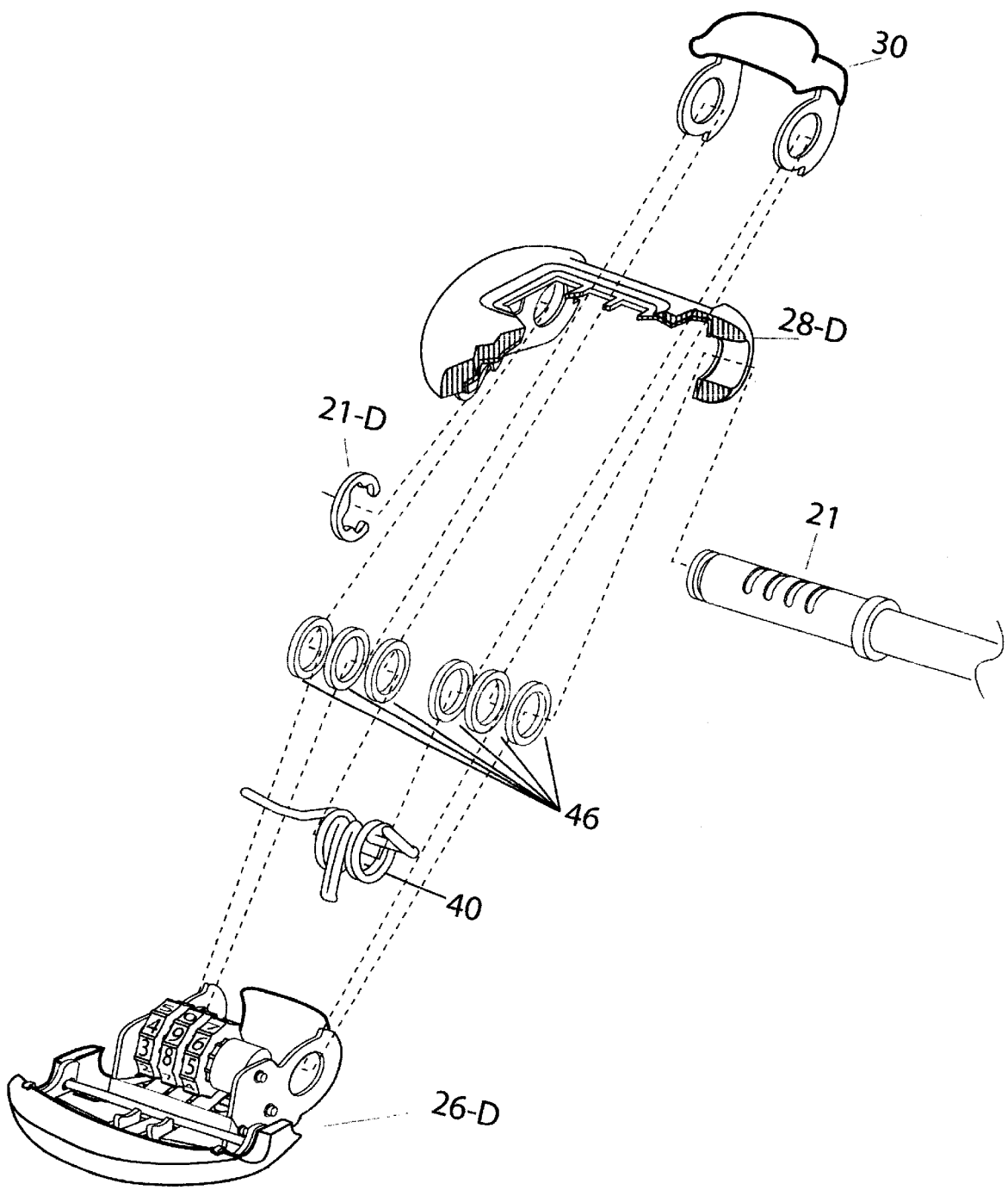
Fig.2-A

Exploded view
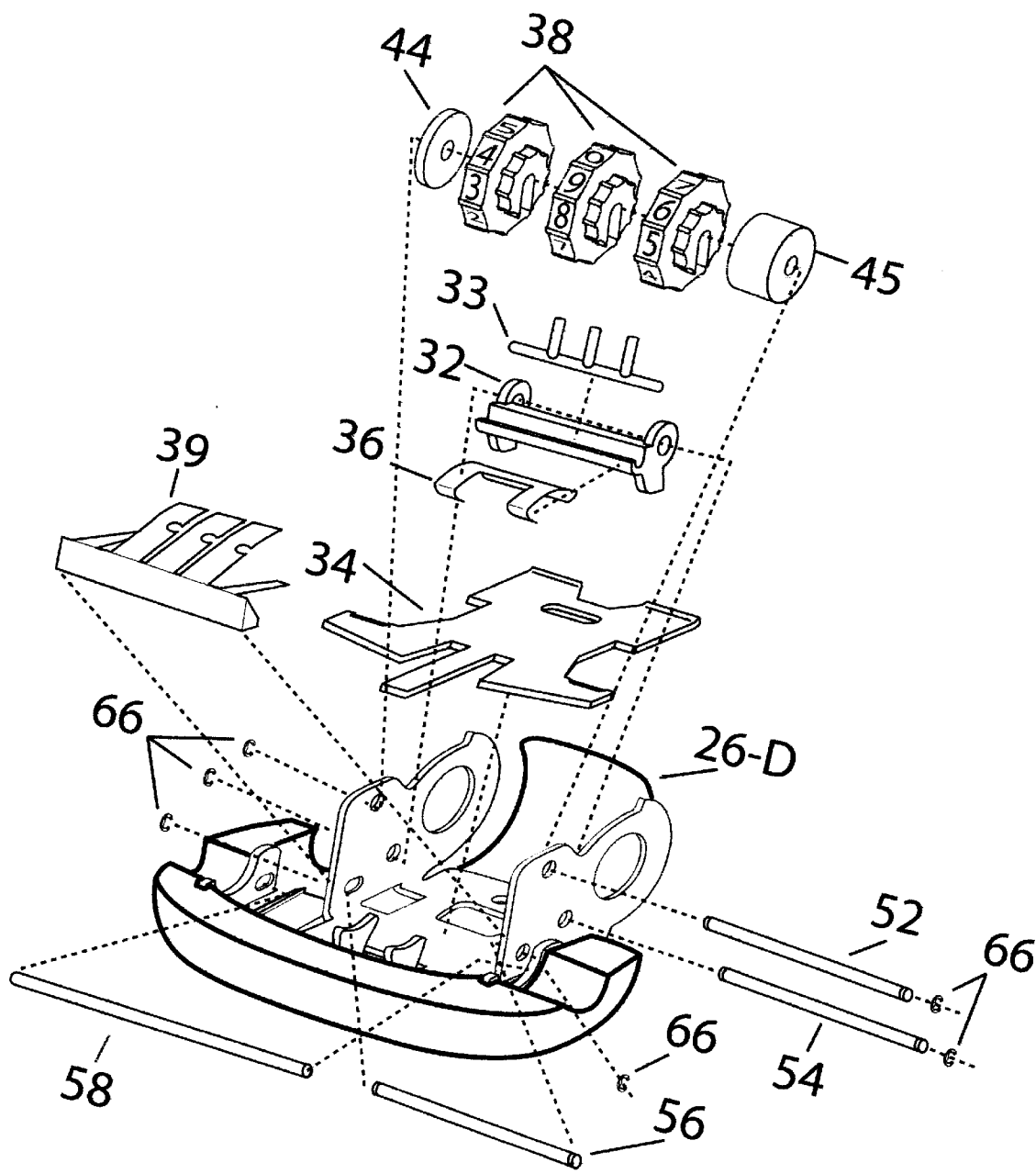
Fig.2-B

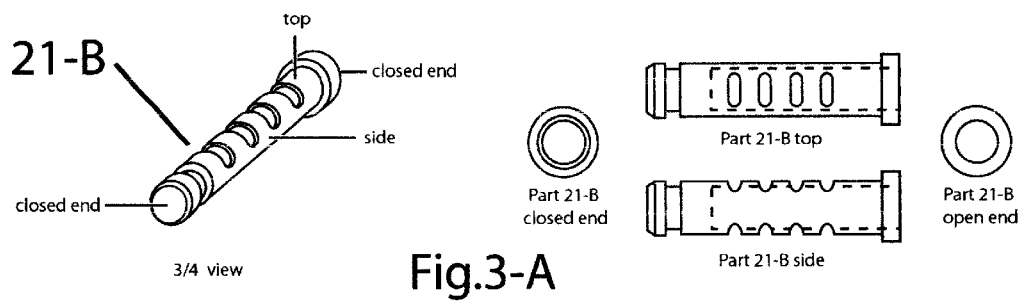
Fig.3-A
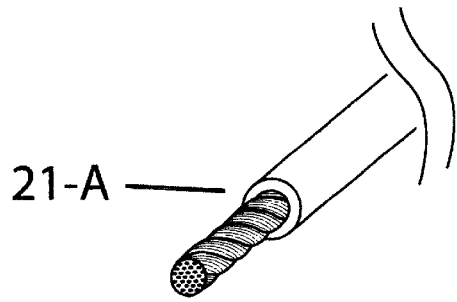
Fig.3-B
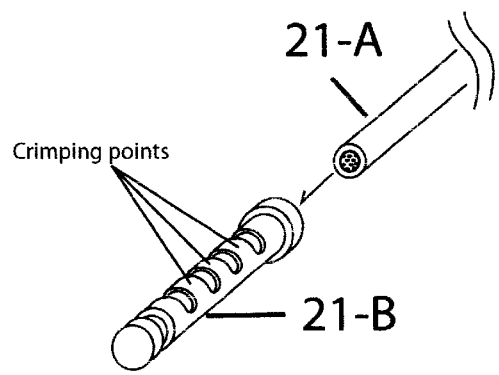
Fig.3-C
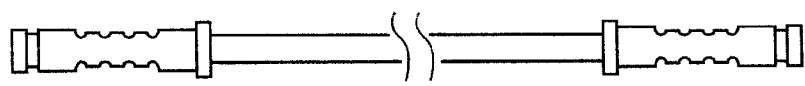
Fig.3-D

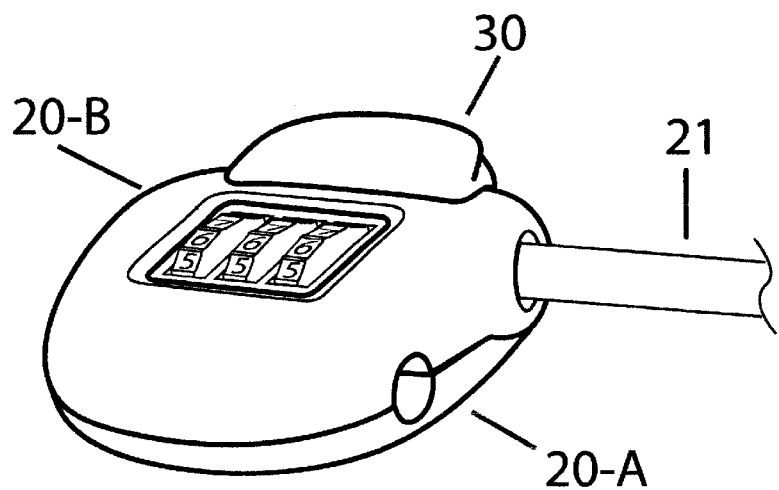
Fig.4-A
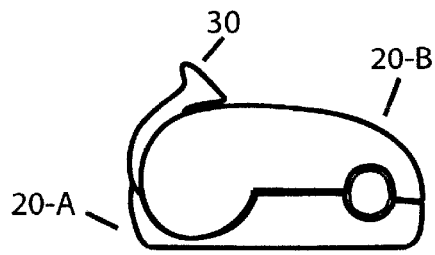
Fig 4-B
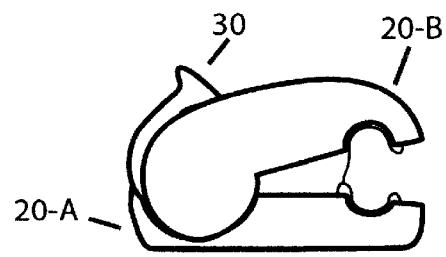
Fig 4-C

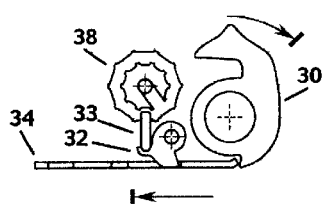
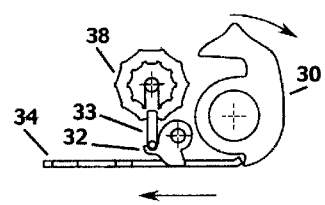
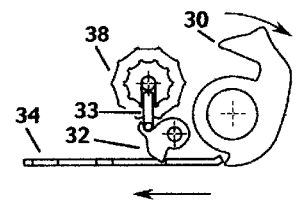
Fig.5-A  Fig.5-B  Fig.5-C
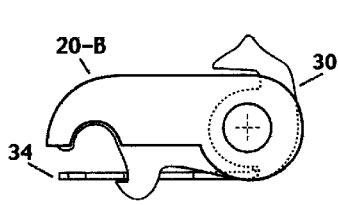
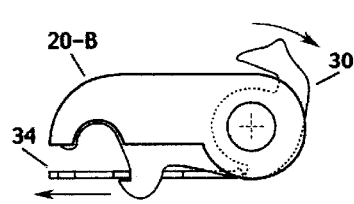
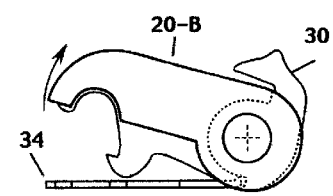
Fig.5-D  Fig.5-E  Fig.5-F

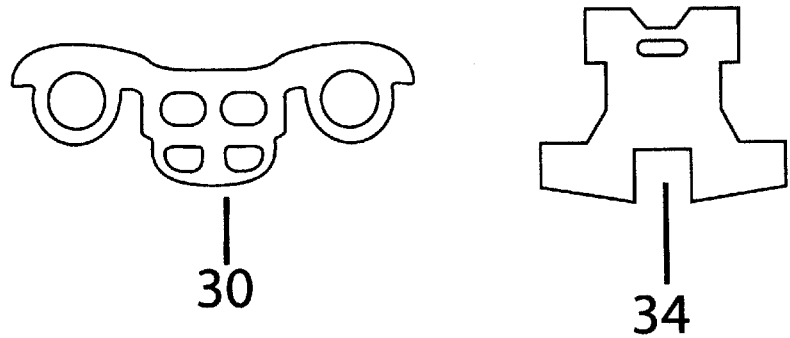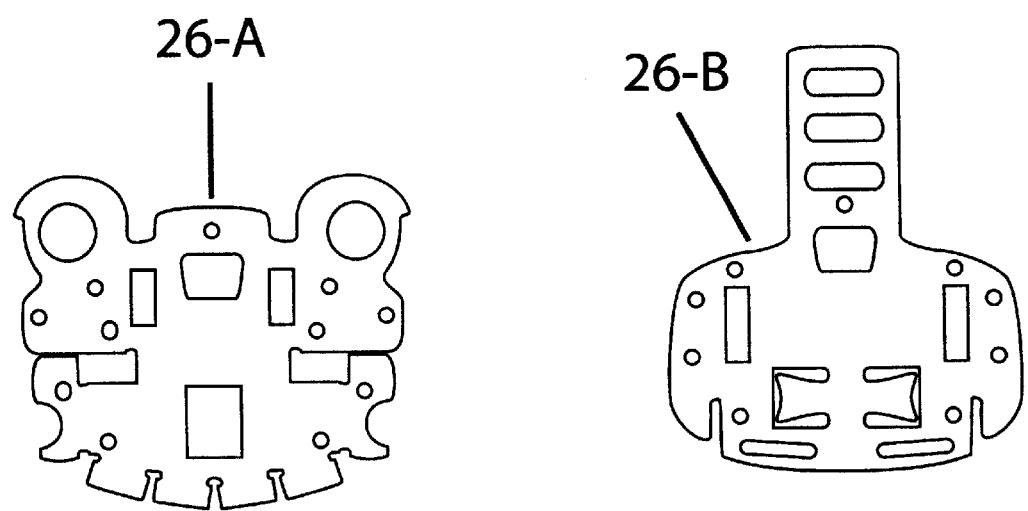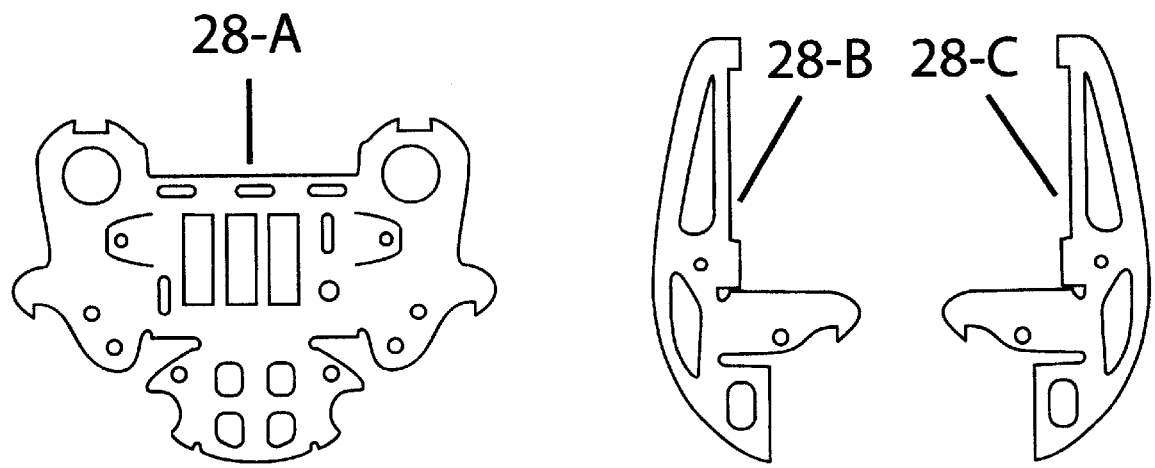
Fig.6-A

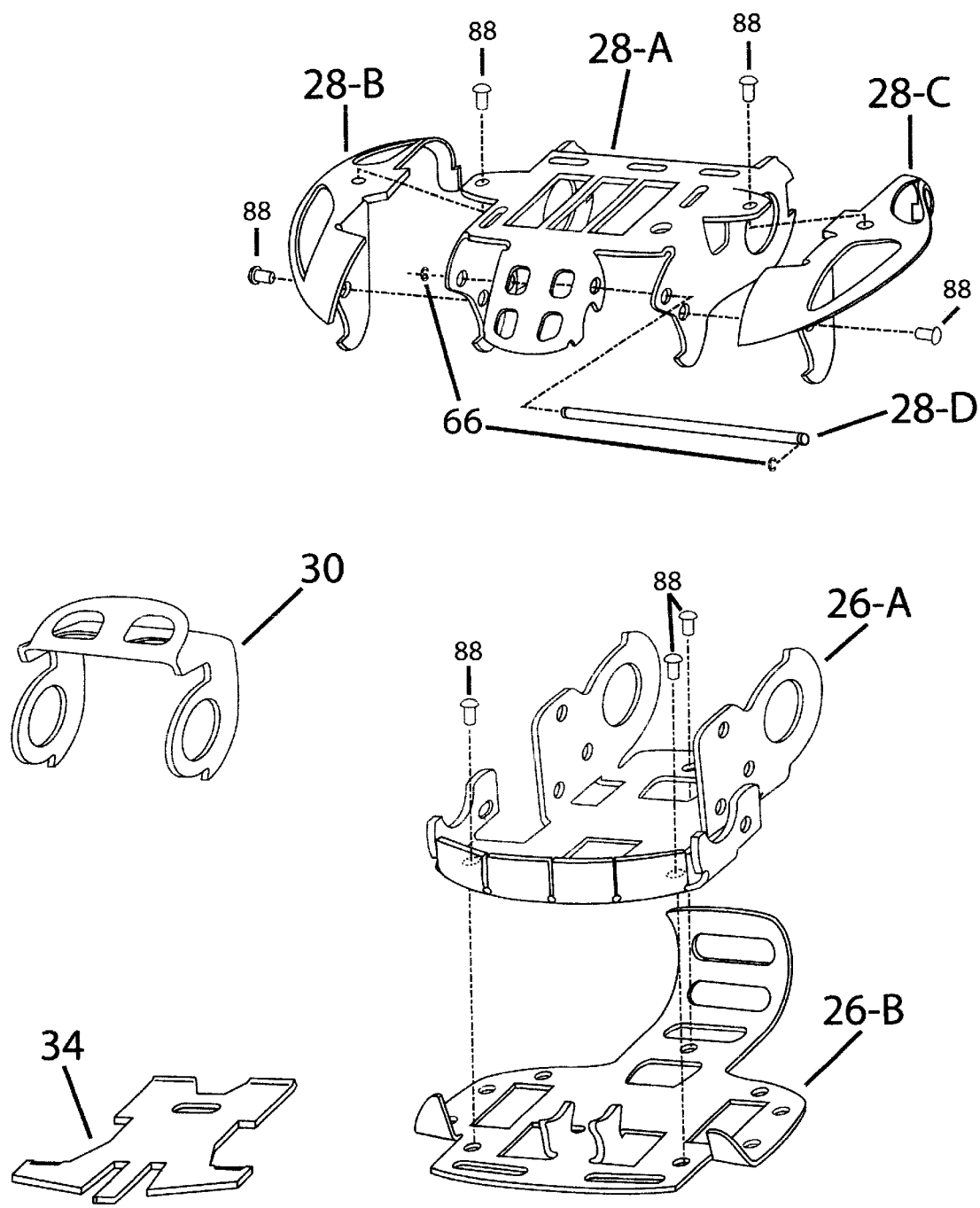
Fig 6-B

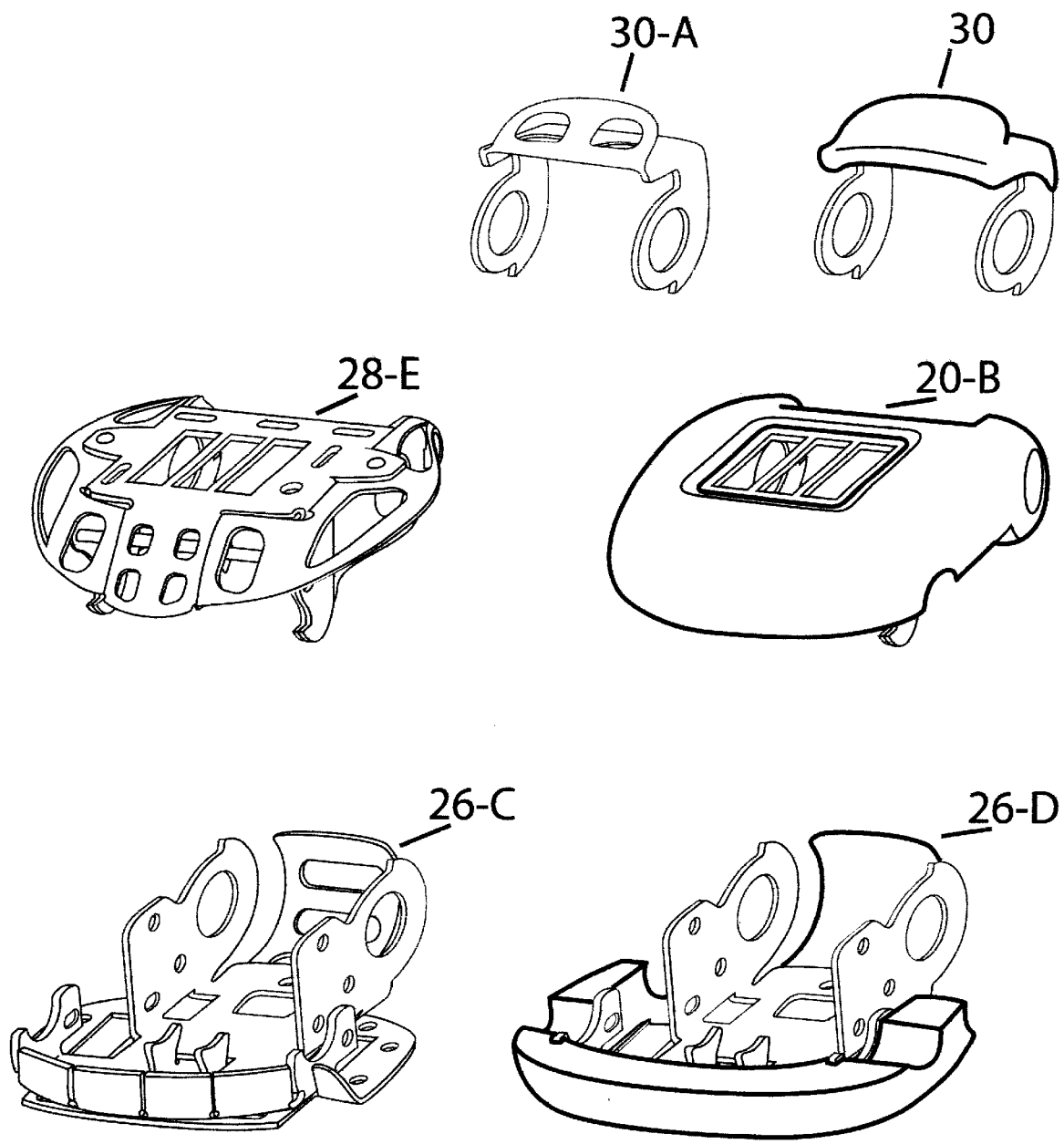
Fig.6-C

ANIMAL THEFT PREVENTION AND
RESTRAINT DEVICE

CROSS REFERENCE TO RELATED
APPLICATIONS

Not applicable

BACKGROUND

1. Field of Invention

This invention relates to animal theft prevention and restraint devices, specifically to such devices which are portable.

BACKGROUND

2. Description of Prior Art

People, outside the agricultural industries, who own or care for animals often take them into public areas. Such individuals may need to perform the errands of daily life simultaneously with the afore-mentioned activity, and in doing so find that they must leave their animal outside a restricted (to animals) establishment. This can leave the animal vulnerable to theft or other unauthorized removal.

To guard against this threat several inventions have been put forth. Some of the first, like U.S. Pat. No. 3,867,905 to Richard W. Vail, Jr. (1975) disclose a chain with a keyed lock box at one end through which the chain passes back creating a loop and a loop sleeved in plastic at the other end. It operates by passing the sleeved loop through a fixed object, then passing the lock box and chain through the sleeved loop. This exposes the first major flaw; it can only be secured to objects which have gaps to pass the sleeved loop through or objects of a height which is prohibitive to removal. The next step is to place the loop created by the lock box and the other end of the chain over the animal's head. Then the chain is pulled through the lock box until the chain is snug around the animals neck and the key is turned to lock the device in place. The process is reversed to unlock the animal. Herein lies the second major flaw, the animal must be released from the device before the device can be removed from the fixed object. This means that the operator must alternately contain the animal while completing the unlocking procedure. These problems have been addressed to some extent in the two lock systems that were patented afterwards.

The "two lock" systems address both of the major flaws of the single lock design. U.S. Pat. No. 4,398,500 to Henry L. Koronkiewicz (1983) discloses a fabric enclosed wire or chain with a keyed locking device at or near each end. On the portion of the wire or chain which addresses the animal, the end is fixed in the lock and the wire or chain passes back through the lock forming an adjustable loop. This loop is passed over the animal's head and the wire or chain is pulled through the lock until snug. At the other end the second lock is secured to the chain or wire at a distance from the end of the wire. This end is passed around or through a fixed object and placed into a slot in the lock and then secured. The loop is one size as determined at manufacture and limits the choices of objects to which it may be attached with security. Also the described construction materials are vulnerable to compromise by simple hand tools. The use of keyed locks also makes it necessary to use two hands to release, which may be inconvenient if the user has packages or items acquired while performing the errand that required the animal to be restrained in the first place. The key, as a separate object, may be misplaced or separated from the main unit, rendering it useless.

This problem is also inherent in U.S. Pat. No. 6,095,094 to Ellen Deborah Phillips (2000) along with the other flaws that go with keyed lock designs. This design has exposed hard comers, edges, and a cable end which could pose a threat to both the animal and property. Said design is made up of several, fully separable parts which, like the keys, can each be misplaced rendering the device useless at any time.

SUMMARY

The invention presented is an animal theft prevention and restraint device, comprised of a high strength cable with a lockable clamp on either end, creating a self-contained, fully adjustable, convenient, one piece system.

OBJECTS AND ADVANTAGES

Accordingly, besides the objects and advantages of the animal theft prevention and restraint device described herein, several objects and advantages of the present invention are:

(a) Provides for one-handed unlocking and release.
(b) Provides for simple use and operation adaptable to multiple circumstances.
(c) Provides for comfort for both animal and escort.
(d) Provides for minimum conductivity of both electrical and thermal energy.
(e) Minimizes potential for damage to animal and property.
(f) Provides a one-piece device to maximize convenience and portability, as well as prevent loss of parts.
(g) Provides both locked and unlocked restraint.
(h) Provides minimum size and weight with out sacrificing needed strength.
(i) Provides for compact storage.
(j) Provides simultaneously adjustable size around the animal, the fixed object, and the distance between them.
(k) Provides for adaptation, through methodology not modification, to a wide variety of other restraint and anti-theft applications.

This device further lends itself to a stylish and modern appearance, is easily and economically produced in a variety of colors to appeal to the various aesthetics of individuals. Still further advantages of this particular design will become apparent from a consideration of the detailed descriptions and drawings.

DRAWING FIGURES

For purposes of clarity in the following drawings, closely related figures have the same number followed by different alphabetic suffixes.

FIG. 1-A Shows the device (invention).

FIG. 1-B Shows the device (invention) in use.

FIG. 1-C Shows the device (invention) in modified use.

FIG. 1-D Shows the device (invention) ready to use.

FIG. 1-E Shows the device (invention) being applied to restrainee.

FIG. 1-F Shows the device (invention) being applied to restrainee.

FIG. 1-G Shows the device (invention) being applied to restrainee.

FIG. 1-H Shows the device (invention) coiled for storage.

FIG. 1-I Shows hand placement for one-handed release of the device (invention).

FIG. 2-A Shows an exploded view of one of the identical ends of the device(invention).

FIG. 2-B Shows an exploded view of a Lower Jaw Assembly (#20-A).

FIG. 3-A Shows an Anchor Post (#21-B) in various views.

FIG. 3-B Shows a dissected view of a Cable(#21-A).

FIG. 3-C Shows how the Cable(21-A) mates with the Anchor Post(21-B).

FIG. 3-D Shows a full assembled Cable Assembly(#21).

FIG. 4-A Shows a Lockable Clamp(#20).

FIG. 4-B Shows a side view of the Lockable Clamp(#20) in its closed position.

FIG. 4-C Shows a side view of the Lockable Clamp(#20) in its open position.

FIG. 5-A Shows the relationship of parts in the Lower Jaw Assembly (.20-A) when closed and locked.

FIG. 5-B Shows the relationship of pants in the Lower Jaw Assembly (.20-A) when closed and unlocked.

FIG. 5-C Shows the relationship of parts in the Lower Jaw Assembly (.20-A) when unlocked and open.

FIG. 5-D Shows the relationship of Upper Jaw Assembly (.20-B) and the Slider(#30) when closed.

FIG. 5-E Shows the relationship of Upper Jaw Assembly (.20-B) and the Slider(#30) when opening.

FIG. 5-F Shows the relationship of Upper Jaw Assembly (.20-B) and the Slider(#30) when open.

FIG. 6-A Shows the stamped metal parts of the Lockable Clamp(#20).

FIG. 6-B Shows the stamped metal parts of the Lockable Clamp(#20), folded and ready for initial assembly.

FIG. 6-C Shows the stamped metal parts of the Lockable Clamp(#20), after initial assembly, before and after casting.

REFERENCE NUMERALS IN DRAWINGS

(20) Lockable Clamp
(20-A) Lower jaw assembly
(20-B) Upper jaw assembly
(21) Cable assembly
[21-A] Anchor post
[21-B] Cable
[21-C] Anchor Clamp
(26-A) Lower jaw plate
(26-B) Base plate
(26-C) Lower Jaw Frame
(28-D) Lower Jaw
(28-A) Upper jaw plate
(28-B) Left Wing
(28-C) Right Wing
(28-D) Jaw Brace
(28-D) Upper Jaw Frame
(30) Release
(32) Lock swing arm
(33) Lock pins
(34) Slider
(36) Swing arm spring
(38) Lock wheel
(39) Lock wheel spring
(40) Main spring
(44) Small washer
(45) Spacing washer
(46) Large washer
(54) Swing axle
(55) Lock axle
(56) Inner slider brace
(57) Jaw Brace
(58) Main slider brace
(65) Cable clamp
(66) Axle clamp
(88) Rivets

DESCRIPTION—FIGS. 1-A, 2-A, 2-B, 6A ,6-B, 6-C—PREFERRED EMBODIMENT.

The animal theft prevention and restraint device, as illustrated in FIG. 1-A, consists of a Cable assembly (#21) which is plastic-coated, and high-strength, such as aircraft cable, with a Lockable Clamp (#20) on either end. The body of the Lockable Clamps (#20), shown in exploded view in FIG. 2-A, is composed of an Upper Jaw Assembly (#20-B) and the Lower Jaw Assembly(#20-A), which contains most of the working parts as detailed in FIG. 2-B, a Release(#30) and a Main Spring (#40). These four parts hinge on an Anchor Post (#21-A). The path of the Anchor Post(#21-A), through the Lockable Clamp(#20) is shown as a dotted line in FIG. 2-A.

The Anchor Post is a metal cylinder with a groove turned near one end and sized to receive the Anchor Clamp(#21-A),which holds the Lockable Clamp(#20) onto said Post. The cylinder is also slightly beveled on the end to ease assembly. The other end of the Anchor Post(#21-A) has a flange and a hole bored through the center, almost the full length of said Post. Four parallel cuts, running perpendicular to the length and penetrating as far as the center bore, are located in alignment on the top and bottom of the Anchor Post(#21-A). The Anchor Post(#21-A) acts as the axle upon which the Upper Jaw Assembly(#20-B), the Lower Jaw Assembly(#20-A), the Main Spring (#40) and the Release (#30) rotate.

The Cable(#21-B) is fully inserted into the bore of the Anchor Post(#21-A) as shown in FIG. 3-C. The crimping points on the Anchor Post(#21-A) allow a section of it to be crimped onto the Cable (#21-B), securing the Cable(#21-B) inside the Anchor Post(#21-A) without distorting said post. The Cable(#21-B) to be used in the said device is widely available and used in many products. Other types of cut-resistant, coated cables may also be substituted for that shown. The complete Cable assembly(#21) when fully assembled is shown in FIG. 3-D.

The Upper Jaw Assembly(#20-B) and a Lower Jaw #26-D), are constructed of stamped, sheet metal pieces, shown in FIG. 6-A. These are folded and assembled as shown in FIG. 6-B to create a framework which is then cast into semi-soft material, such as rubber or plastic, and as shown in FIG. 6-C. The Lower Jaw(#26-D) is the portion of the Lower Jaw Assembly(#20-A) in which the parts that combine to make the mechanisms for clamping, locking and releasing, are held, as shown in FIG. 2-B. In the order of assembly the first piece placed into the Lower Jaw Box (#26-D) is a Slider (#34), which is stamped metal,shown in FIGS. 6-A, and 6-B. The Slider (#34) is held in place by a Main Slider Brace (#58) and a Inner Slider Brace (#56), both of which are metal rods, the Inner Slider Brace (#56) has a groove at each end to receive Axle Clamps (#66) which hold the Inner Slider Brace (#56) in place. The Main Slider Brace (#58) is placed in at an angle and forced into place so that it is held by the elasticity of the outer casting on the Lower Jaw Box (#26-D). A Swing Arm Spring (#36) is a folded sheet metal spring, which acts as a clamp to hold a Lock Pins (#33) and a Lock Swing Arm (#32) together. These parts are machined metal, and are held into the Lower Jaw Box (#26-D) by a Swing Axle (#54), which is held in place by two Axle Clamps (#66). A Lock Wheel Spring (#39), a sheet metal spring, snaps into place gripping the Lower Jaw Box (#26-D) at the same points as the Inner Slider Brace (#56) passes through it. The Lock Wheel Spring (#39) holds the Lock Pins (#33) upright. A Lock Wheel (#38) is a cast plastic or metal single unit comprised of two cylinders with hole a bored into the center. Each cylinder has ten facets around the outside, the larger containing embossed numbers from one to ten, and the smaller with one of the facets recessed into the center bore as shown in FIG. 2-B. Three Lock Wheels (#38), along with a Small Washer (#44) and a Spacing Washer (#45), both of which are plastic, are stacked along a Lock Axle (#52) as in FIG. 2-B. The Lock Axle (#52) is a metal rod with a groove at each end to receive an Axle Clamp (#66) on each side to hold it in place.

OPERATION—FIGS. 1-B, 1-C, 1-D, 1-E , 1-F, 1-G, 1-H, 1-I, 4-A, 4-B, 4-C, 5-A, 5-B, 5-C, 5-D, 5-E, 5-F

To operate the animal theft prevention and restraint device begin by checking that the Cable Assembly(#21) is uncoiled and the Lockable Clamp(#20) is in the open position as in FIG. 1D. Then the cable assembly(#21) is looped around the neck of the animal to be restrained and across the Lockable Clamp(#20) as shown in FIG. 1-E. Place the Cable Assembly(#21) in the open Lockable Clamp(#20) as shown in FIG. 1-F. Pull the Cable Assembly(#21) through the open Lockable Clamp until it becomes snug to the animal's neck so that the loop will no longer pass over the head or down the body of the animal, as shown in FIG. 1-G. Squeeze the Lockable Clamp(#20) until it locks onto the Cable Assembly (#21). The Main Spring(#40) maintains tension inside the Lockable Clamp(#20) to hold it in the open position until squeezed. At this point the Lock Wheels (#38) maybe rotated out of sequence to prevent release by unauthorized persons.

Next, extend the other end of said device around or through a fixed object chosen to restrain the animal. It can be looped around that fixed object as many times as necessary to create the desired length of cable between the fixed object and the animal. It also must be wrapped tightly enough so as not to be removed from the fixed object, see FIGS. 1-B and 1-C. Squeeze the open Lockable Clamp(#20) against the force of the Main Spring(#40), securely onto the Cable Assembly(#21) until the Upper Jaw Assembly(#20-B) engages the Slider(#34), pushing the Slider(#34) forward, against the force of the Main Spring(#40). The shape of the Upper Jaw Assembly(#20-B) allows the Slider(#34) to be pulled back by the Main Spring(#40), catching the Upper Jaw Assembly(#20-B), see FIG. 5-D. When caught the Upper Jaw Assembly(#20-B) will firmly hold the Cable Assembly(#21) against the Lower Jaw Assembly(#20-A). The Lock Wheels(#38) can then be rolled out of sequence. This will prevent the Lock Pins(#33) from moving upward and subsequently prevent the Lock Swing Arm(#32), the Slider(#34) and the Release(#30) from moving, seen in FIG. 5-A, so as to prevent opening by unauthorized persons. At this point the animal is restrained and, if the fixed object is properly chosen, the animal will be secure until the owner returns.

To release the animal theft prevention and restraint device first rotate the Lock Wheels(#38) into their appropriate sequence, as in FIG. 5-B, if they have been scrambled previously as in FIG.5-A. Press the Release(#30 to rotate back which moves the Slider(#34) forward as in FIG. 5-C. This is allowed by the Lock Swing Arm(#32) rotating and pushing the Lock Pins(#33) into a gap in the Lock Wheel (#38) made available by having rotated said Wheel into its proper sequence, shown in FIGS. 5-B and 5-C. These actions push the Slider (#34) forward and disengage the Upper Jaw Box(#28-A), as in FIG. 5-E, and the Upper Jaw Box(#28-A) rotates to the open position, as in FIG. 5-F. The Main Spring (#40) supplies the force to open the Lockable Clamp (#20). The Cable Assembly (#21) is freed from the Lockable Clamp(#20) and that end of said device can be removed from the fixed object. For the user to perform one-handed release, the user holds the Cable Assembly(#21) at the closest point to the Lockable Clamp(#20) so that the thumb is toward the Lockable clamp(#20) as in FIG. 1-H. This allows the user to manipulate the Lock Wheels(#38) and the Release(#30) can then be pressed with the same thumb allowing the user to pull the Cable Assembly (#21) free of the Lockable Clamp(#20) while maintaining control of the restrained animal.

At this point the device may be used as a classic leash and collar combination or the Release(#30) for the Lockable Clamp(#20) on the animal can pressed to open the Lockable Clamp(#20) on the animal and free the animal from the device completely. The Cable Assembly(#21) can then be coiled tightly and the Lockable Clamps(#20) can be run through the middle and clipped to the Cable Assembly(#2 1) for compact storage, FIG. 1-I.

CONCLUSIONS, RAMIFICATIONS, AND SCOPE

Accordingly, the reader will see that the animal theft prevention and restraint device of this invention can be used to secure an animal with ease, convenience, and safety, as well as allow for quick and simple release with one hand, while maintaining control of the restrained animal. In addition, simultaneously adjustable size around the animal, the fixed object, and the distance between them gives the user a exceptional flexibility for a range of animals and objects to which animals might be restrained. Furthermore the device of this invention has additional advantages in that, it provides for comfort for both animal and escort.

it provides for minimizing conductivity of both electrical and thermal energy.

it minimizes potential for damage to animal and property.

it provides a one-piece device to maximize convenience, portability and lost parts.

it provides both locked and unlocked restraint.

it provides minimum size and weight without sacrificing needed strength.

it provides for compact storage.

it provides for adaptation to a wide variety of other restraint and anti-theft applications.

it lends itself to a stylish and modern appearance and is easily and economically produced in a variety of colors to appeal to the various aesthetics of individuals.

Although the description above contains many specifications, these should not be construed as limiting the scope of the invention, but as merely providing illustrations of some of the presently preferred embodiments of this invention. For example, some of the parts which are comprised of several parts permanently fixed together may be created from one piece; the shape of the lockable clamp (#20) might be altered to allow greater leverage against the release(#30); the lock wheels(#38) and adjacent parts might be replaced with an electronic system using voice recognition, finger print identification or other security system which is self contained, in order to unlock the lockable clamp(#20), etc.

Thus the scope of the invention should be determined by the appended claims and their legal equivalents, rather than by the examples given.

I claim:

1. An animal anti-theft and restraining device comprising:
   a cable having two ends and a locking clamp at each of the ends, the locking clamps adapted to form a first adjustable loop for securing animals of various sizes and a second adjustable loop for attaching the device to various sized objects, the locking clamps including self-contained security locks to prevent the unauthorized release of the animal, the locks capable of one-handed locking and release.

2. The device of claim 1, wherein the lock further includes a security code.

3. The device of claim 2, wherein the security code includes an electronic code.

4. The device of claim 3, wherein the security code includes voice recognition code.

5. The device of claim 3, wherein the security code includes fingerprint identification.

6. The device of claim 2, wherein the lockable clamp includes a spring-loaded jaw assembly that locks around a post member.

7. The device of claim 2, wherein the security code is contained on a plurality of wheels bearing numbers.

8. The device of claim 2, wherein the security code is contained on a plurality of wheels bearing numbers.

9. The device of claim 1, wherein the device lacks pointed edges capable of injuring the animal.

10. The device of claim 1, wherein the device is adapted to be coiled into a portable, compact unit for storage.

11. The device of claim 1, wherein the exposed device components which are metallic are covered or coated with sufficient non-conductive material to provide insulation from electrical current and/or thermal energy.

* * * * *